Figure 1:
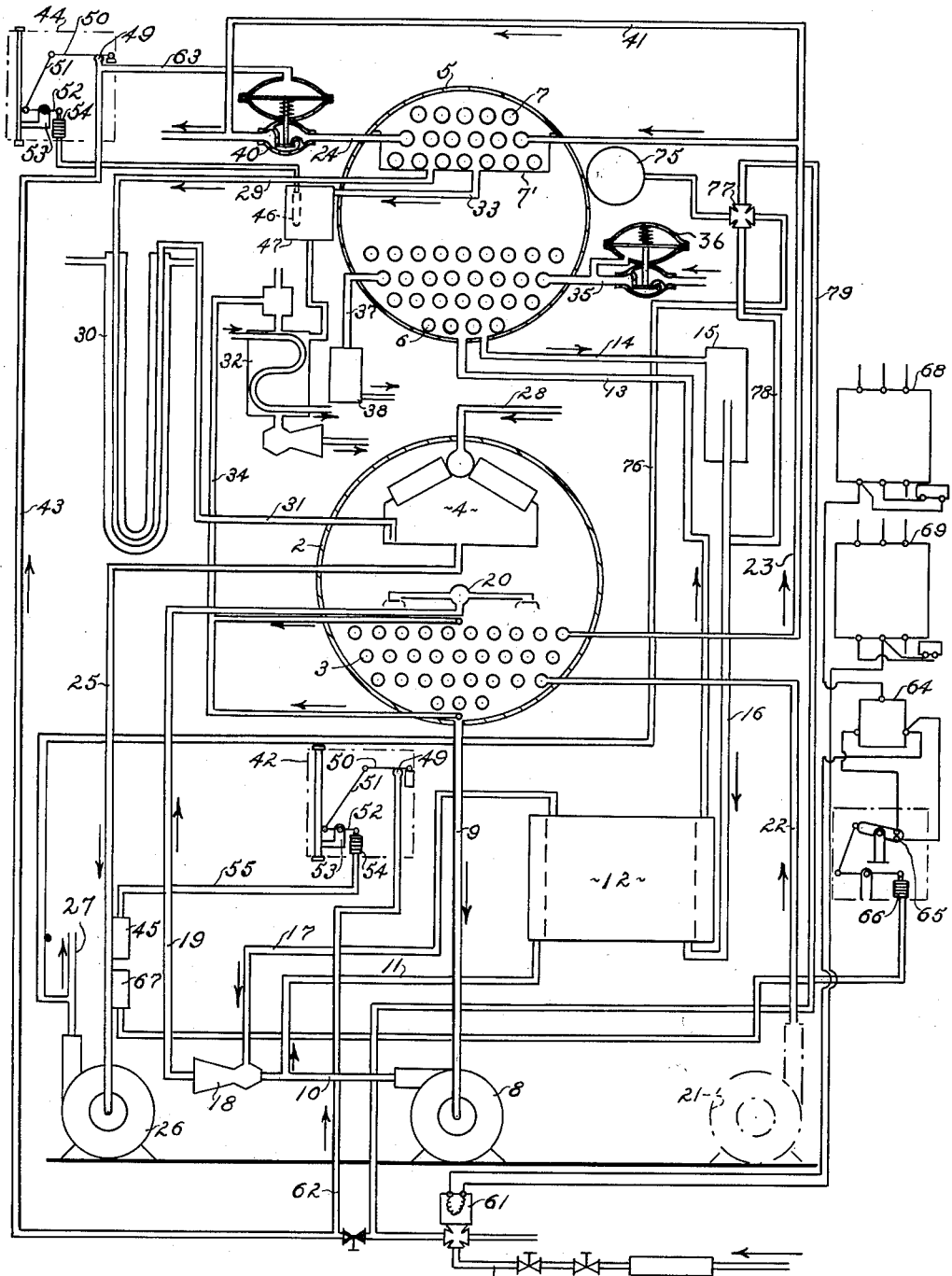

Nov. 8, 1955  L. H. LEONARD, JR  2,722,805
CONTROL ARRANGEMENT FOR ABSORPTION REFRIGERATION SYSTEM
Filed Aug. 7, 1951  3 Sheets-Sheet 1

INVENTOR.
Louis H. Leonard, Jr.
BY Herman Seid
atty.

United States Patent Office 2,722,805
Patented Nov. 8, 1955

2,722,805

CONTROL ARRANGEMENT FOR ABSORPTION REFRIGERATION SYSTEM

Louis H. Leonard, Jr., East Syracuse, N. Y., assignor to Carrier Corporation, Syracuse, N. Y., a corporation of Delaware Application August 7, 1951, Serial No. 240,645

13 Claims. (Cl. 62—5)

This invention relates to an absorption refrigeration system employing water as a refrigerant and a solution of lithium bromide and water as an absorbent which includes an improved control arrangement for regulating the capacity of the machine and the concentration of solution leaving the generator.

A satisfactory control system has been devised for an absorption refrigeration system of this type as shown in the copending application of Alexis A. Berestneff, Serial No. 683,390, filed July 13, 1946, now Patent No. 2,565,838. The control arrangement shown in such copending application is based upon maintenance of desired concentrations of solution leaving the generator and upon variation in flow of solution through the system to regulate the capacity of the system. While this system is adequate in operation, it is complex so that the usual unskilled operator may have difficulty in satisfactorily regulating the machine at start-up. In addition, it is expensive in initial cost even though it is satisfactory in operation.

The chief object of the present invention is to provide an absorption refrigeration system embodying an improved control arrangement which permits effective regulation of the machine over a wide range—from full load to substantially zero load.

An object of the present invention is to provide an absorption refrigeration system employing water as a refrigerant and a solution of lithium bromide and water as an absorbent which embodies an economical control arrangement for regulating the capacity of the machine and the concentration of strong solution leaving the generator.

A further object is to provide an absorption refrigeration system in which the capacity is controlled by regulating the ability of the condenser to perform work and in which regulation of the concentration of solution leaving the generator is based on the thermodynamic properties of the solution.

A still further object is to provide an absorption refrigeration system in which the steam input to the generator is balanced with the refrigeration requirements without using a steam valve.

A still further object is to provide an absorption refrigeration machine which is operated at as low a solution concentration as possible to reduce the possibilities of accidental solidification and in which the concentration of solution leaving the generator is only as high as necessary to satisfy the leaving chilled water temperature requirements.

A still further object is to provide an absorption refrigeration machine which is protected against possible solidification of solution in case the external load is completely removed.

A still further object is to provide a control arrangement for an absorption refrigeration system which automatically takes advantage of lower condensing water temperates by permitting operation of the system at lower solution concentrations.

A still further object is to provide a method of operation of an absorption refrigeration system in which the ability of the condenser to perform work is regulated to provide a desired capacity and in which the concentration of solution leaving the generator is changed as required in accordance with the load imposed upon the system, the desired leaving chilled water temperature and the entering condensing water temperature, while maintaining a substantially constant flow of solution through the system. Other objects of my invention will be readily perceived from the following description.

This invention relates to an absorption refrigeration system which includes an absorber, an evaporator, a generator, and a condenser. The absorber and evaporator preferably are disposed in a shell. Preferably, the generator and condenser are disposed in a second shell which may be placed above the first shell. The absorber and the generator are connected to permit flow of strong solution from the generator to the absorber and flow of weak solution from the absorber to the generator. The condenser serves to condense refrigerant vapor boiled off in the generator, the condensate being returned to the evaporator where it is flash cooled, the flashed vapor passing to the absorber to be absorbed by solution therein. Condensing water is passed through the absorber and the condenser; a valve is disposed in the condensing water line to regulate flow of condensing water through the condenser and hence the ability of the condenser to perform work. A thermostatic control is provided which is actuated in response to the temperature of chilled water leaving the evaporator, such temperature reflecting the load imposed upon the system. This first control regulates passage of compressed air to a second thermostatic control actuated in response to a change in saturation temperature corresponding to pressure in the generator-condenser shell. This second control actuates the valve in the condensing water line to move to an opened or closed position to regulate flow of water through the tubes of the condenser. A by-pass is provided about the condenser in order to maintain the flow of condensing water substantially constant through the absorber even though its passage through the tubes of the condenser be retarded or throttled.

This invention further relates to a method of operation of an absorption refrigeration system in which the steps consist in maintaining substantially constant flow of solution through the system, controlling the ability of the condenser to perform work in response to load imposed upon the system, supplying steam to the tubes of the generator at a pre-determined pressure, and regulating the concentration of solution leaving the generator by varying the condenser temperature in response to load imposed upon the system.

Figure 2:
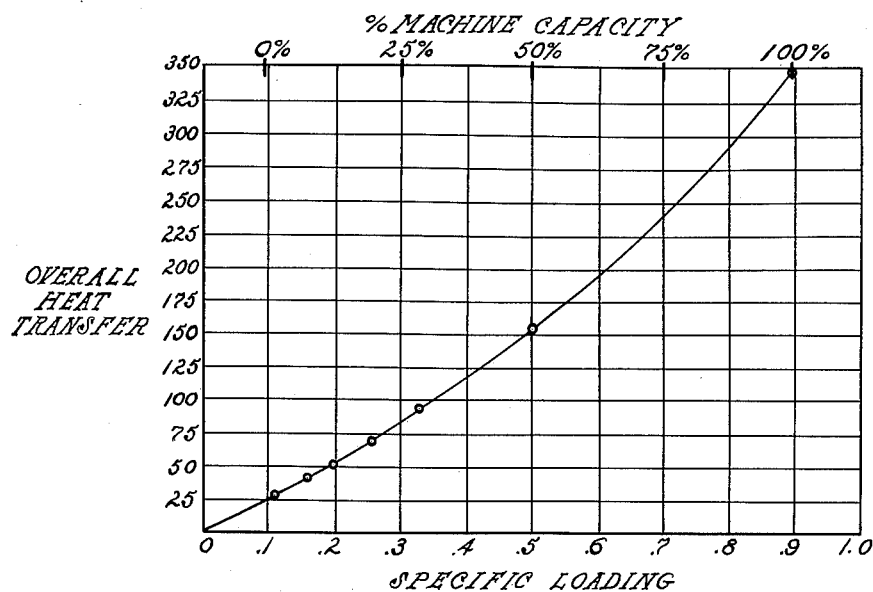
Figure 3:
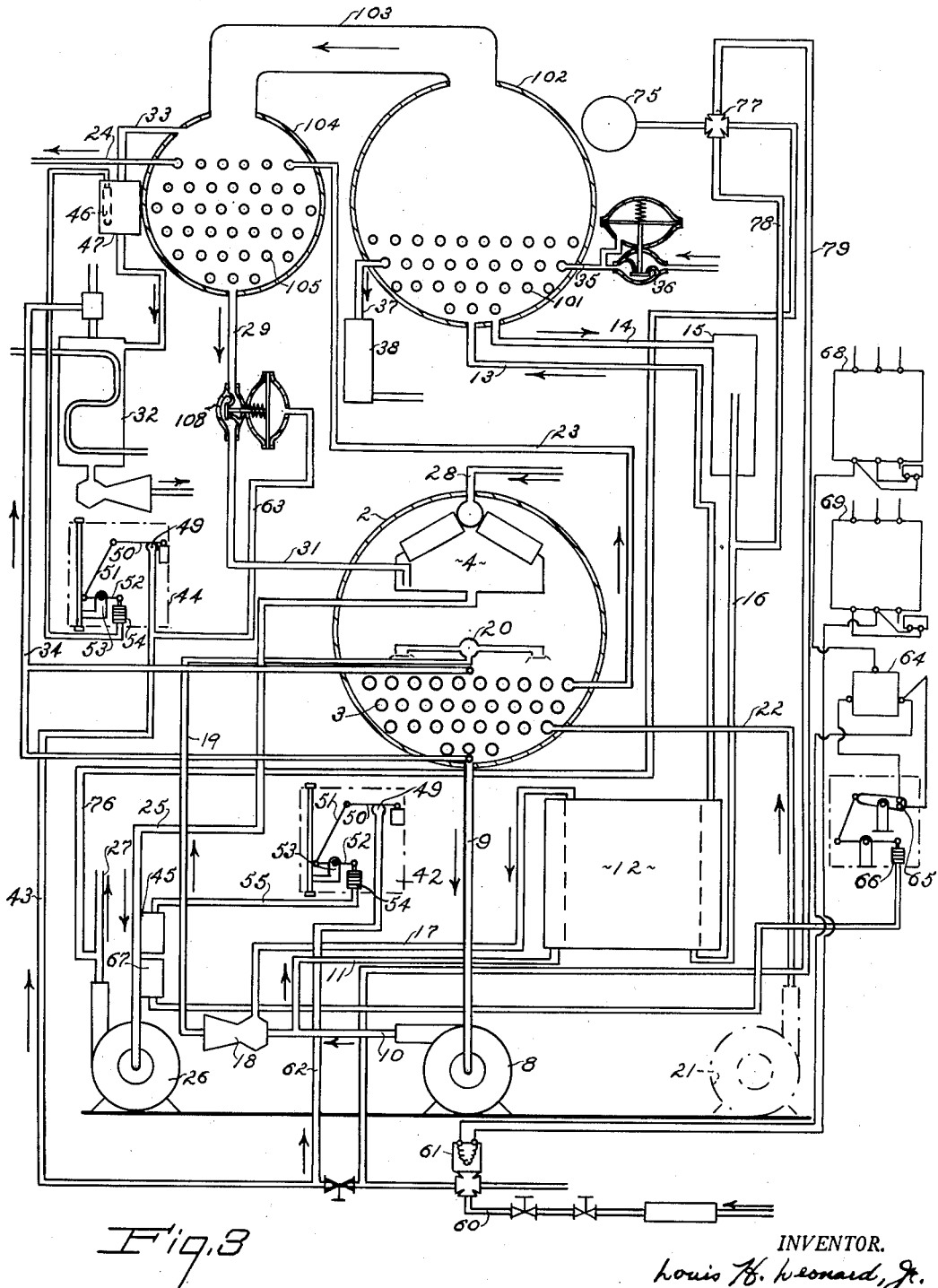

The attached drawings illustrate a preferred embodiment of my invention in which Figure 1 is a diagrammatic view of an absorption refrigeration system embodying the present control arrangement;

Figure 2 is a graph illustrating the manner in which the generator overall heat transfer changes in accordance with the load imposed upon this system; and Figure 3 is a view similar to Figure 1 of a modification.

Referring to the attached drawings, I have illustrated diagrammatically in Figure 1 an absorption refrigeration system embodying my improved control arrangement. The system comprises a shell 2 containing a plurality of tubes 3 which cooperate with the shell to form an absorber. Placed in shell 2 above absorber 3 is a pan-like member 4 which cooperates with shell 2 to form an evaporator. A second shell 5 preferably is placed above the first shell. Tubes 6 extend in the lower portion of shell 5 and cooperate with shell 5 to form a generator. A plurality of tubes 7 are placed in the upper portion of shell 5 to form a condenser. The tubes 7 cooperate with a pan-like member 7' and with the shell to form a condenser.

A pump 8 withdraws weak solution from absorber 3 through line 9. Pump 8 forwards the weak solution through line 10, line 11, heat exchanger 12, and line 13 to generator 6. Strong solution is withdrawn from generator 6 through line 14 to an overflow arrangement 15 which maintains a desired level of solution in generator 6, line 16, heat exchanger 12, line 17 to an ejector 18 which forwards the strong solution through line 19 to spray arrangement 20 which sprays the strong solution over the tubes of absorber 3. Pump 8 forwards a portion of weak solution through line 10 to ejector 18. Discharge of the weak solution in ejector 18 serves to induce strong solution from line 17 into the ejector and to forward the mixture of strong and weak solutions to the spray arrangement 20. It will be appreciated that pump 8 maintains a substantially constant flow of solution through the system.

Pump 21 supplies condensing water through line 22 to the tubes 3 of the absorber. The condensing water after passage through tubes 3 passes through line 23 to the tubes 7 of the condenser. The condensing water after passage through the tubes of condenser is discharged to a cooling tower or drain through line 24.

Chilled water is withdrawn from the evaporator 4 through line 25 by pump 26 and is circulated to a place of use, which may be the central station of an air conditioning system, through line 27. The chilled water is returned to the evaporator through line 28 and is flash-cooled in the evaporator, the flashed vapor passing to the absorber.

Condensate leaves condenser 7 through line 29, passes through a pre-cooler 30 and is returned to the evaporator through line 31 being flash-cooled in the evaporator, the flashed vapor passing to the absorber 3 as previously described.

A suitable purge arrangement 32 is provided to remove non-condensible gases from condenser 7 and absorber 3. Purge 32 is connected to condenser 7 by line 33. Purge 32 is connected to absorber 3 by line 34.

Steam passes to the tubes of generator 6 through line 35. A pressure reducing valve 36 is provided in line 35 to assure that the pressure of steam passing to generator 6 is controlled at a predetermined point. If desired, a steam boiler control may be employed.

Steam condensate leaves the tubes of generator 6 through line 37, a steam trap 38 being provided in line 37 to assure that only condensate leaves the generator.

A normally closed pneumatic valve 40 is placed in line 24 (Figure 1) to regulate passage of condensing water through the tubes of condenser 7. Valve 40 is actuated as hereinafter described. A bypass 41 is provided about condenser 7 in order that the flow of condensing water may be maintained substantially constant while varying the volume of condensing water passing through the tubes of condenser 7.

A thermostatic control 42 serves to regulate the pressure of air passing through branch line 43 to a second thermostatic control 44. Thermostatic control 44 in turn regulates the air pressure applied to valve 40. Thermostatic control 42 is actuated by means of a bulb 45 placed adjacent chilled water line 25. Bulb 45 reflects the temperature of chilled water which in turn indicates the load imposed upon the system. The control 44 is actuated by bulb 46 which reflects saturation temperature corresponding to pressure in shell 5. Preferably bulb 46 is placed in a casing or housing 47 disposed in line 33. Thermostats 42 and 44 are similar in design. Each includes a vent 49 adapted to be closed by a flapper 50 which is supported by a lever 51 connected to an arm 52 pivoted at 53. Referring to thermostat 42, the opposite end of arm 52 is connected to a bellows 54 which forms a portion of the thermal responsive system including bulb 45, being connected to bulb 45 by capillary 55. Pressure is supplied to the controls through main air line 60; preferably a solenoid valve 61 or relay of suitable design is placed therein as a safety control as hereinafter described. Air pressure passes from line 60 to line 43; thermostat 42 is connected to line 43 by branch line 62; thus pressure in branch line 43 may be regulated by thermostat 42 venting a portion of air therein to the atmosphere in accordance with the temperature of chilled water.

Thermostat 44 has air pressure applied therein through line 43 and vents air to atmosphere through vent 49 as determined by saturation temperature corresponding to pressure in shell 5. Branch line 43 is also connected to valve 40 by line 63; thermostats 42 and 44 regulate the air pressure applied to the diaphragm of valve 40.

A rotary switch 64 is provided which is connected to a mercury switch 65. Mercury switch 65 may be actuated by means of a bellows 66 and a bulb 67 placed adjacent the chilled water line. Mercury switch 65 serves in effect as a safety control; an increase in temperature of chilled water above a pre-determined point opens the switch thereby closing solenoid valve 61 to prevent supply of air to thermostats 42 and 44 and valve 40. The starters 68 and 69 actuate the motors (not shown) of the solution pump 8 and chilled water pump 26. A starter for the condensing water pump 21 is not shown since such pump and motor are generally provided by the installer.

If desired, any suitable arrangement may be provided to permit dilution of the solution upon shut-down of the machine. For example, a dilution tank 75 may be provided connected by line 76 to chilled water pump 26. A three-way valve 77 is placed in such line; valve 77 is also connected by line 78 to strong solution line 16. Preferably valve 77 is pneumatically actuated and is connected by branch line 79 to main air line 60. Thus as shown at start-up, valve 77 is open to permit pump 26 to fill tank 75 with chilled water. When operation of the machine is discontinued for any reason, valve 77 is actuated to permit tank 75 to drain by gravity through line 78 into strong solution line 16, adding refrigerant to the solution and preventing possible crystallization if the machine be permitted to remain shut down for an extended period. This dilution arrangement is shown and claimed in the co-pending application of Alexis A. Berestneff, Serial No. 65,482, filed December 15, 1948. Other suitable dilution arrangements may be employed if desired.

The term "weak solution" is used herein to describe a solution weak in absorbing power. The term "strong solution" is used herein to define a solution strong in absorbing power.

The preferred absorbing solution is a solution of lithium bromide and water. The preferred refrigerant is water. With such solution, the maximum allowable solution concentration leaving the generator is 66%. A greater concentration may permit crystallization to occur throughout the system causing solidification in the heat exchanger and in other portions of the system.

Leaving chilled water temperature is determined by the concentration and temperature of solution entering and leaving the absorber. The concentration of solution entering the absorber is determined by the concentration of solution leaving the generator when mixed with the impelling flow from the absorber.

In the present invention, capacity control is obtained by regulating the capacity of the condenser to do work. As previously described, such control is attained by regulating the flow of condensing water through the condenser or if desired, such control may be achieved by varying the level of condensate in the condenser thereby rendering a portion of the heat exchange surface of the condenser ineffective to condense refrigerant vapor. In this case, of course, it would be necessary to place a valve 103 similar to valve 40 in condensate line 29 rather than in condensing water line 24. Control of solution concentration is based on the thermodynamic properties of the solution.

In dealing with binary saturated solutions, such as lithium bromide and water, there are three variable properties. These properties are vapor pressure, temperature, and concentration. By fixing any two of these three properties, the third is automatically established at some definite point. Hence, by either controlling or limiting the maximum solution temperature and controlling the condensing temperature, t ehmaximum solution concentration is automatically determined.

I have found that a maximum allowable solution concentration leaving the generator is about 66% at 100% capacity; at such full load, the difference between the temperature of solution leaving the generator and the condensing temperature is about 105° F. This specific temperature difference applies to the range of solution temperatures normally encountered with an absorption refrigeration machine employing a solution of lithium bromide and water as the absorber and water as the refrigerant. This maximum differential is maintained by accepting the solution temperature leaving the generator which in turn is dependent upon the fixed pressure temperature, heat transfer, etc., and regulating the condensing temperature so that under all circumstances during operation, the temperature difference between condensing temperature and temperature of solution leaving the generator is not more than 105° F. Control 44 prevents the temperature differential becoming more than 105° F. under any conditions.

With the design of the present machine when the steam pressure is fixed at about 15 p. s. i. g., solution concentrations over 66% are not encountered frequently if normal entering condensing water temperatures, say about 85° F., exist during operation. Under these conditions, the primary function of the control arrangement is to prevent decrease in condensing pressure below a pre-determined point. If condensing pressure decreases below such pre-determined point, the pressure differential which exists between the generator shell and the suction of the solution ejector may not be sufficient to permit concentrated solution to return from the generator. The control arrangement also prevents the solution from solidifying if a sudden drop in condensing water temperature occurs or if excessive flow of condensing water to the condenser occurs due to improper adjustment when the machine is first placed in operation.

Considering the operation of the device at full load (100% capacity), it will be appreciated that the pressure of steam supplied to the generator is fixed by pressure reducing valve 36; since the pressure is fixed, the temperature is likewise fixed. At full load, the temperature of solution leaving the generator is fixed. At full load, the temperature differential between the temperature of solution leaving the generator and the condensing temperature, employing a solution of lithium bromide and water as the absorber and water as the refrigerant in a 66% concentration, is 105° F. If the temperature of condensing water is low, a differential of less than 105° F. is satisfactory if it produces the necessary capacity because the absorber may operate at a much lower solution concentration if the temperature of the condensing water is low. That is, the same mean effective temperature difference required to transfer the same amount of heat may be obtained with much lower solution concentrations.

Low entering condensing water temperatures will permit the machine to operate at lower solution concentrations for the same leaving chilled water temperatures. In other words, the machine takes advantage of working at lowest possible solution concentrations to prevent accidental solidification. The control arrangement is designed to maintain the temperature differential between condensing temperature and temperature of solution leaving the generator at a temperature not greater than 105° F. which assures efficient operation of the machine and eliminates any possibility of crystallization of solution throughout the system.

Compressed air pressure is applied to thermostats 42 and 44 through main line 60 and branch lines 62 and 43. Thermostat 42 serves to vary the pressure in line 43 in accordance with variations in temperature of chilled water leaving the evaporator which reflects the load upon the system. Thermostat 44, in response to variation in saturation temperature corresponding to pressure in shell 5, varies the air pressure imposed upon valve 40 which regulates passage of condensing water through the tubes of condenser 7.

At full load, both controls 42 and 44 are effective to regulate valve 40. Valve 40 is regulated to maintain the temperature differential at 105° F. or less, depending upon the entering and condensing water temperature, chilled water temperature desired, etc. Slight changes in chilled water temperature and saturation temperature corresponding to pressure in shell 5 are reflected by bulbs 45, 46 so that the controls function to move valve 40 toward open or closed positions to maintain the required differential.

A control arrangement for an absorption refrigeration system should maintain the amount of water or refrigerant absorbed in the absorber in exact balance with the amount of water or refrigerant boiled off in the generator. If more refrigerant is boiled off in the generator than is absorbed in the absorber, solidification of the solution will result. If less refrigerant is boiled off in the generator than is absorbed in the absorber, the absorbent solution will become more dilute and the machine will lose capacity until an equilibrium point is reached. At full load, the balance between the amounts of refrigerant absorbed in the absorber and boiled off in the generator is maintained by limiting the steam pressure, controlling the condensing temperature and by the basic design of the machine.

At partial loads, chilled water temperature decreases which causes the condensing water flow to the condenser to be throttled which limits the ability of the condenser to perform work. The condenser in turn limits the ability of the generator to perform work and the balance between refrigerant absorbed in the absorber and refrigerant boiled off in the generator is upset; when the ability of the generator to perform work is limited, less refrigerant is boiled off and the solution is more dilute, in turn limiting the ability of the absorber to perform work so that the overall capacity of the machine is decreased. In other words, by limiting the work performed by the condenser, the work performed in the generator is reduced which reduces the ability of the absorber to perform work in turn reducing the ability of the evaporator to perform work.

Control of the system is based upon the ability of the condenser to perform work and the fact that the condenser is indirectly able to control the amount of work done in the generator. Since the solution flow throughout the system is constant, capacity regulation is obtained by change in concentration of solution leaving the generator. Since the concentration of solution leaving the generator decreases with a decrease in load, it will be appreciated that the maximum concentration of 66% is required only when the machine is operated at full load. At zero load, there is no change in solution concentration leaving the generator and leaving the absorber (or entering the generator).

Heat input to the generator derived by the condensing steam, is determined by the mean effective temperature difference in the generator, the generator overall heat transfer, and the amount of generator heat transfer surface. At partial load, solution temperature decreases and the mean effective temperature difference between the solution and steam is increased. Even though the mean effective temperature difference in the generator increases at partial loads, the overall heat transfer decreases in a much greater proportion; thus the generator input is kept in balance with the load requirements at partial load. The change in specific loading in the generator affects the generator heat transfer as will be observed by referring to Figure 2. It will be noted that as the specific loading of the generator decreases, the overall heat transfer likewise decreases and the capacity of the machine is reduced. The term "specific loading" may be defined as the amount of heat transferred through a unit of heat transfer surface.

Considering operation of the system under partial load, temperature of chilled water leaving the evaporator reduces below the control point of thermostat 44 and causes a proportionate decrease in pressure in branch line 43 since thermostat 42 is moved to an air venting position. Under normal conditions at partial load, thermostat 44 is ineffective and valve 40 may be deemed to be regulated directly by thermostat 42.

As temperature of chilled water decreases, thermostat 42 regulates valve 40 to decrease the volume of condensing water passing through the tubes of condenser 7. Since the volume of condensing water passing through the tubes of condenser 7 is decreased, the condenser is able to do less work, thus the condensing temperature increases. The increase in condensing temperature causes a proportionate increase in pressure in shell 5. A decrease in the work performed by the generator is caused by the decrease in the ability of the condenser to perform work so that the specific loading on the generator is reduced resulting in the overall heat transfer being proportionately reduced with less refrigerant being boiled off. Since less refrigerant is removed from the solution in the generator, the concentration of solution leaving the generator is reduced.

At partial load, as the condensing temperature increases, concentration of solution leaving the generator decreases, and the temperature difference between the condensing temperature and the solution temperature leaving the generator also decreases at partial load. Since the condenser is able to do less work, the temperature differential between solution leaving the generator and the condenser temperature is less than 105° F. If, for example, an unexpected increase in steam pressure or a drop in entering water temperature occurs, this temperature difference will increase to a point where thermostat 44 becomes effective automatically to throttle valve 40 to reduce still more the amount of condensing water passing through condenser 7.

Concentration of solution leaving the generator decreases on partial load operation since the condensing temperature increases due to the fact that less condensing water is passing through the tubes of the condenser. The pressure of steam supplied to the generator remains substantially constant so that the generator heat transfer will decrease due to a change in specific loading giving a decrease in generator capacity.

As an illustration, assume for example that at full load the temperature of solution leaving the generator is 220° F.; the differential is 105° F. so that the condensing temperature is 115° F. Fixed steam temperature is 250° F. so that the mean effective temperature difference is 30° F. The solution concentration leaving the generator is 66%. Temperature of chilled water leaving the evaporator is 45° F. Suppose the load drops to 50% capacity. Such decrease in load is reflected by the temperature of chilled water leaving the evaporator which decreases to approximately 43° F. Immediately, thermostat 42 is actuated to move valve 40 toward a closed position, throttling flow of condensing water through the tubes of condenser 7. Since less condensing water passes through condenser 7, the condenser is able to do less work and the condensing temperature rises to about 130° F. Rise in condensing temperature increases the pressure in shell 5. The decrease in the ability of the condenser to perform work reduces the ability of the generator to perform work resulting in the overall heat transfer being reduced with less refrigerant being boiled off. Since less refrigerant is boiled off, the concentration of solution leaving the generator decreases thus changing the capacity of the machine to balance the change in load imposed thereon.

It will be appreciated the capacity of the machine may be reduced to substantially zero load. The generator heat transfer can be reduced only a certain amount which never approaches zero. By keeping a constant solution flow to the generator under all load conditions, the generator still must do considerable work even at zero refrigeration load, since the heat input required for the heat of dilution varies directly as the load on the machine. With a constant solution flow to the generator, the amount of heat required for pre-heating the solution remains almost constant throughout the entire range of capacity. Thus the generator heat transfer does not have to reduce to zero for zero load operation.

In Figure 3, I have illustrated a modification of the invention in which the absorption refrigeration system is controlled by varying the level of condensate in the condenser rather than by varying the flow of condensing water through the tubes of the condenser. As shown in Figure 3, the generator 101 is placed in a shell 102 which is connected by a duct 103 to a shell 104 in which is placed the condenser 105. Condensate line 29 connects the bottom of shell 104 with evaporator 4. No loop 30 is necessary in this construction since the control valve acts as a vapor seal between the two shells. The submerged portion of the condenser provides sufficient sub-cooling. A valve 108 similar to valve 40 is placed in line 29 rather than in line 24. In the structure shown in Figure 3, the flow of condensing water through the tubes of the condenser is constant.

As discussed above, the system is controlled by the level of condensate maintained in the condenser. It will be appreciated condensate renders ineffective the heat exchange surface of the condenser submerged therein. As the level of condensate in the condenser varies, more or less heat exchange surface is rendered inffective thereby varying the capacity of the condenser. The level of condensate in the condenser is varied by means of valve 108 which throttles flow of condensate through line 29 to the evaporator 4. In other respects, the control system is the same as previously described in connection with Figure 1.

It will be appreciated this three-shell structure affords a more economical structure since it is not necessary to design the condenser to compensate for the extreme changes in temperature, etc. to which it is subject when the condenser and generator are placed in the same shell.

The present invention permits flow of solution through the system to be maintained substantially constant while varying the concentration of the solution in accordance with changes in condensing temperature. It is essential in the present invention that the maximum temperature differential between condensing temperature and temperature of solution leaving the generator be not more than a maximum of 105° F. A greater differential increases the danger of crystallization of solution throughout the system. The present invention accepts a pre-determined steam pressure and temperature of solution leaving the generator and permits variation in condensing temperature to regulate capacity and concentration of solution leaving the generator.

The present invention provides a highly effective control arrangement for an absorption refrigeration machine employing a solution of lithium bromide and water as an absorber and water as the refrigerant. While I have explained that the temperature differential between condensing temperature and temperature of solution leaving the generator is at a maximum of 105° F. under full load conditions, it will be understood that if other saline solutions are employed, this temperature differential may vary depending upon the specific absorbing solution employed. In any event, however, it will be a pre-determined maximum temperature differential which will permit satisfactory operation of the machine over a wide range of capacity.

The present invention provides a control system which permits satisfactory control of an absorption refrigeration machine during operation at full and partial loads. The control arrangement provided permits the machine to be operated over a wider range of capacity than heretofore available. The present control arrangement permits operation from 100% capacity to substantially zero capacity which has not been attainable heretofore in an absorption refrigeration system of the type contemplated by any control system known to me.

The control arrangement is more economical than other control arrangements heretofore provided and greatly reduces the time required to install and place the machine in satisfactory operation.

While I have described a preferred embodiment of my invention it will be understood my invention is not limited thereto since it may be otherwise embodied within the scope of the following claims.

I claim:

1. In an absorption refrigeration system, the combination of a generator, a condenser, an evaporator and an absorber placed in a closed circuit, the circiut containing a saline solution as an absorbent and water as a refrigerant, means for maintaining substantially constant flow of solution through the system, and means for varying the concentration of solution leaving the generator without interference with solution flow by varying the effectiveness of the condenser in response to a decrease in the load imposed upon the system, the concentration varying means being actuated in response to variation in temperature of water leaving the evaporator.

2. In an absorption refrigeration system, the combination of a generator, a condenser, an evaporator and an absorber placed in a closed circuit, the circuit containing a saline solution as an absorbent and water as a refrigerant, means for maintaining substantially constant flow of solution from the absorber to the generator and from the generator to the absorber, means for maintaining maximum concentration of solution leaving the generator at full load, and means for varying the concentration of solution leaving the generator by varying the effectiveness of the condenser to perform work responsive to a change in temperature of water leaving the evaporator without interference with solution flow in the system.

3. In an absorption refrigeration system, the combination of a generator, a condenser, an evaporator and an absorber placed in a closed circuit, the circuit containing a saline solution as an absorbent and water as a refrigerant, means for maintaining substantially constant flow of solution through the system, a valve for regulating flow of condensing medium through the condenser, a thermostatic control responsive to variation in saturation temperature corresponding to variation in condenser pressure for regulating said valve, and a thermostatic control responsive to variation in load imposed upon the system to regulate said valve.

4. In an absorption refrigeration system, the combination of a generator, a condenser, an evaporator and an absorber placed in a closed circuit, the circuit containing a saline solution as an absorbent and water as refrigerant, means for maintaining substantially constant flow of solution through the system, means for maintaining substantially constant steam pressure in the generator, a pneumatic valve for regulating flow of condensing medium through the condenser, a source of supply of compressed air connected to the valve, a thermostatic control connected to the compressed air supply for regulating said valve in response to variation in saturation temperature corresponding substantially to variation in condenser pressure, and a second thermostatic control connected to the compressed air supply for varying the air pressure supplied to the first control and the valve in response to variation in load imposed upon the system.

5. An absorption refrigeration system according to claim 4 in which a safety control is provided to prevent passage of compressed air to the controls and the valve in response to a variation in temperature of water leaving the evaporator beyond a predetermined range thereby discontinuing operation of the system.

6. In an absorption refrigeration system the combination of a shell, an element in said shell cooperating therewith to form an absorber, a second element in said shell disposed above the first element cooperating with the shell to form an evaporator, a second shell, a member in said second shell cooperating therewith to form a generator, a second member in said shell placed above the first member and cooperating with the shell to form a condenser, the generator, condenser, absorber and evaporator being placed in a closed circuit, the circuit containing a saline solution as an absorbent and water as a refrigerant, means for maintaining substantially constant flow of solution from the absorber to the generator and from the generator to the absorber, and means for controlling the difference in temperature between the saturated condensing temperature and temperature of solution leaving the generator to establish the maximum concentration of solution leaving the generator useable without crystallization which would interfere with solution flow in the system.

7. In an absorption refrigeration system, the combination of a shell, an element in said shell cooperating therewith to form an absorber, a second element in said shell disposed above the first element cooperating with the shell to form an evaporator, a second shell, a member in said second shell cooperating therewith to form a generator, a second member in said second shell placed above the first member and cooperating with the shell to form a condenser, the generator, condenser, absorber and evaporator being placed in a closed circuit, the circuit containing a saline solution as an absorbent and water as a refrigerant, means for maintaining substantially constant flow of solution through the system, means for maintaining substantially constant steam pressure in the generator, a valve for regulating flow of condensing water through the condenser, a thermostatic control responsive to variation in saturation temperature corresponding substantially to variation in condenser pressure for regulating said valve, and a thermostatic control responsive to variation in load imposed upon the system to regulate said valve.

8. An absorption refrigeration system according to claim 7 in which a safety control is provided to discontinue operation of the system in response to a variation in temperature of water leaving the evaporator beyond a predetermined range.

9. In the operation of an absorption refrigeration system containing an absorber, an evaporator, a generator, and a condenser and employing a saline solution as an absorbent and water as a refrigerant, the steps which consist in maintaining a substantially constant flow of solution from the absorber to the generator and from the generator to the absorber, maintaining at full load a predetermined maximum difference in temperature between the saturated condensing temperature and temperature of solution leaving the generator to establish the maximum concentration of solution leaving the generator, and at partial load decreasing the difference in temperature between the saturated condensing temperature and temperature of solution leaving the generator by varying the effectiveness of the condenser to perform work thereby decreasing the concentration of solution leaving the generator without interference with solution flow between the absorber and the generator.

10. In the operation of an absorption refrigeration system containing an absorber, an evaporator, a generator and a condenser and employing a saline solution as an absorbent and water as a refrigerant, the steps which consist in maintaining a substantially constant flow of solution from the absorber to the generator and from the generator to the absorber, maintaining at full load a predetermined maximum difference in temperature between the saturated condensing temperature and temperature of solution leaving the generator to establish the maximum concentration of solution leaving the generator, and upon a reduction in load imposed upon the system decreasing the concentration of solution leaving the generator without interference with solution flow between the absorber and the generator by varying the effectiveness of the condenser to perform work.

11. In the operation of an absorption refrigeration system containing an absorber, an evaporator, a generator and a condenser disposed in a closed circuit and employing a saline solution as an absorbent and water as a refrigerant, the steps which consist in maintaining a substantially constant flow of solution from the absorber to the generator and from the generator to the absorber, maintaining a substantially constant steam pressure in the generator, maintaining at full load a predetermined maximum difference in temperature between the saturated condensing temperature and temperature of solution leaving the generator to establish the maximum concentration of solution leaving the generator, and, upon a reduction in load imposed upon the system, increasing the condensing temperature responsive to the load imposed on the system.

12. In the operation of an absorption refrigeration system according to claim 11 in which the flow of condensing medium to the condenser is throttled to increase the saturated condensing temperature.

13. In the operation of an absorption refrigeration system containing an absorber, an evaporator, a generator, and a condenser placed in a closed circuit and employing a saline solution as an absorbent and water as a refrigerant, the steps which consist in maintaining a substantially constant flow of solution from the absorber to the generator and from the generator to the absorber, maintaining a substantially constant steam pressure in the generator, maintaining at full load a predetermined maximum difference in temperature between the saturated condensing temperature and temperature of solution leaving the generator to establish the maximum concentration of solution leaving the generator, and, at partial load, decreasing the difference in temperature between saturated condensing temperature and temperature of solution leaving the generator by varying the effectiveness of the condenser to perform work thereby decreasing the concentration of solution leaving the generator without interference with solution flow between the absorber and the generator.

References Cited in the file of this patent

UNITED STATES PATENTS

| | | |
|---|---|---|
| 1,014,120 | Coleman | Jan. 9, 1912 |
| 1,477,127 | Kasley | Dec. 11, 1923 |
| 2,298,924 | Bichowsky | Oct. 13, 1942 |
| 2,356,638 | Williams | Aug. 22, 1944 |
| 2,365,757 | Bichowsky | Dec. 26, 1944 |
| 2,378,177 | Bichowsky | June 12, 1945 |
| 2,495,904 | McNeely | Mar. 29, 1949 |
| 2,502,104 | Reid | Mar. 28, 1950 |
| 2,550,428 | Reid | Apr. 24, 1951 |
| 2,550,429 | Reid | Apr. 24, 1951 |